E. HANNER.
TREE OR PLANT SUPPORT.
APPLICATION FILED JULY 26, 1920.
1,377,832. Patented May 10, 1921.
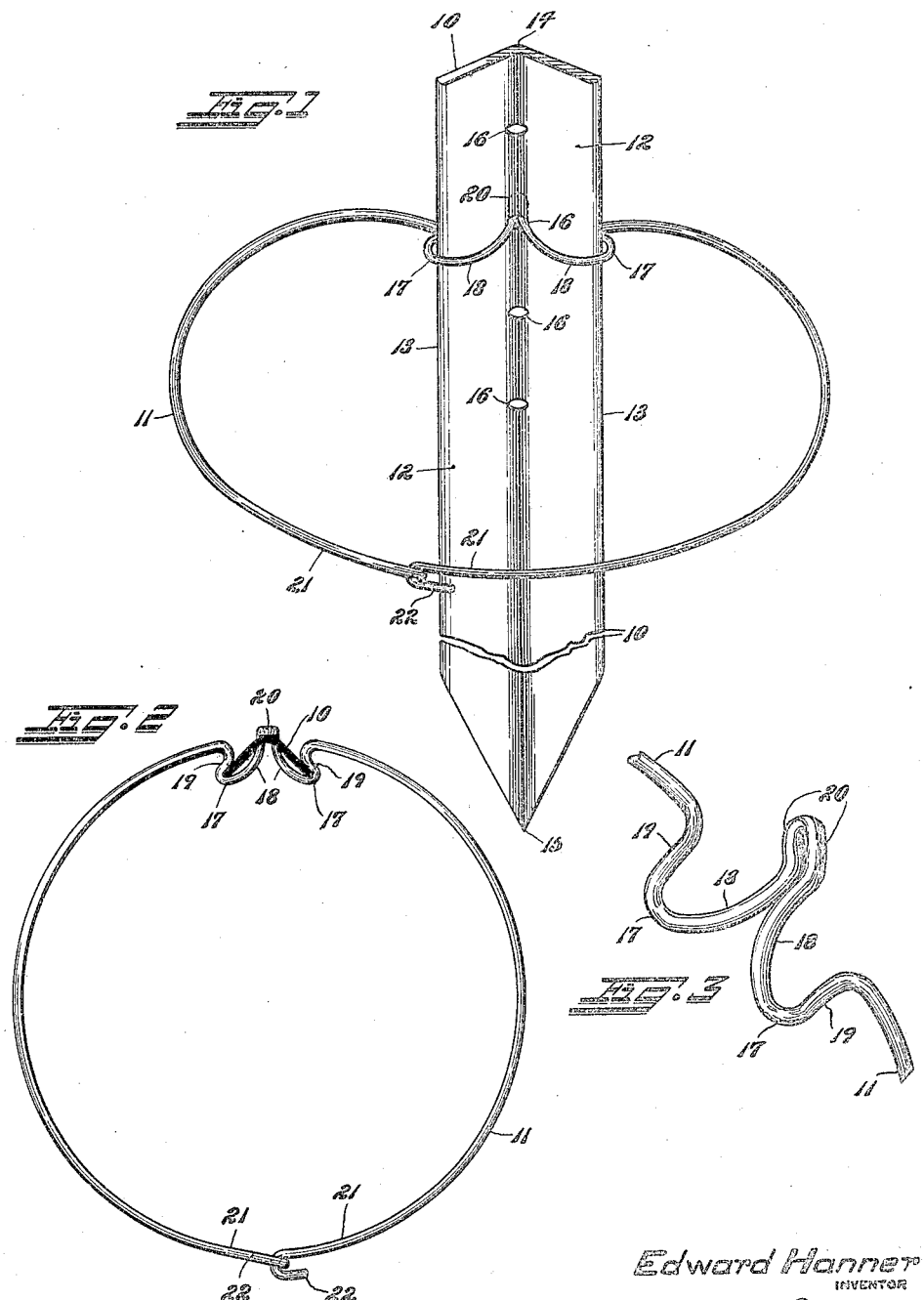

UNITED STATES PATENT OFFICE.

EDWARD HANNER, OF PHILADELPHIA, PENNSYLVANIA.

TREE OR PLANT SUPPORT.

1,377,832.　　　　Specification of Letters Patent.　　Patented May 10, 1921.

Application filed July 26, 1920. Serial No. 398,856.

*To all whom it may concern:*

Be it known that I, EDWARD HANNER, a citizen of the United States, residing at Philadelphia, in the county of Philadelphia and State of Pennsylvania, have invented new and useful Improvements in Tree or Plant Supports, of which the following is a specification.

An object of the invention is to provide a support for trees or plants which can be cheaply manufactured and provides adjustable features so that it can be adapted to plants or trees of different heights and different diameters.

The invention comprehends among other features the provision of a plant support which consists essentially of two main parts namely a standard or stake and a plant or tree encircling member in the nature of a support ring or loop, the latter being so constructed that it can be readily attached to and detached from the stake and arranged at different heights thereon.

In the further disclosure of the invention, reference is to be had to the accompanying drawings constituting a part of this specification, in which similar characters of reference denote corresponding parts in all the views, and in which, Figure 1 is a fragmentary perspective view of the support.

Fig. 2 is a fragmentary plan view, and

Fig. 3 is a fragmentary perspective view of that part of the supporting member for engagement with the stake.

Referring more particularly to the views, it will be seen that the device consists substantially of two members 10, 11, the former in the nature of a standard or stake and the latter in the nature of a hoop or ring. The standard or stake 10 is preferably formed of a single piece of sheet-like material having a certain amount of resiliency and which is bent in a substantially V-shape in cross section as shown, thus forming sides 12 having longitudinal edges 13 with the sides terminating in a longitudinal apex 14. The lower end of the stake is preferably pointed as at 15 so that it can readily be inserted in the ground and along the apex there are formed a number of elongated openings 16, one-half of which are substantially formed in one of the sides and the other half on the other side.

The hoop or ring 11 preferably consists of a single piece of wire-like material which at a certain point on the periphery thereof, is bent to form a plurality of inwardly extending ears 17 forming inner sides 18 and outer sides 19 with the inner sides converging and extending outwardly and terminating in an upwardly bent hook 20. The ring or hook 11 may be entirely closed or may have the ends 21 formed into hook members 22, relatively engaged as shown. This latter construction is quite desirable for the reason that with a hook of this character, should the hook not be sufficiently large in diameter to encircle a large plant, the hooks can be disengaged, thus increasing the diameter of the hook and enabling it to encircle the plant.

In the use of the device described the standard or stake is driven into the ground adjacent the plant or tree and the hook or ring, encircling the plant is now arranged to have the hook 20 extend through one of the openings 16 so that the upwardly extending portion of the hook will bear against the back of the stake or apex 14, thus tending to support the hoop in a horizontal position, the sides 12 of the stake being received between the sides 18, 19 of the ears 17, with the inner sides 18 so formed in length as to the sides 12 of the standard or stake, that when the hoop is engaged with the stake and brought to a horizontal position relative thereto, the edges 13 of the sides 12 will bring about a binding action as to the ears 17 at the points where the ears engage with the edges, this being due to the relative construction of the sides of the stake and the inner sides of the ears as well as to the material from which the ring or hoop is made.

From the foregoing description it will be seen that the device, while consisting essentially of two parts, provides a support which can be very cheaply manufactured and which in its application is very simple and can be readily arranged in the desired position to support a plant or tree without the necessity of using tools or implements to accomplish the result.

Having described my invention, I claim—

1. A tree or plant support comprising a standard provided with openings and formed of a V-shape in cross section to provide diverging sides of the openings formed at the apices thereof and a hoop having a portion formed to provide inwardly extending ears and an outwardly and upwardly extending hook, the latter engaging with the standard through one of the openings thereof with the sides of the standard extending into and engaging with the ears of the hoop.

2. A tree or plant support comprising a standard formed to provide diverging sides and a hoop having a portion formed with inwardly extending ears and an upwardly extending hook with the outwardly diverging sides of the standard engaging with the inner portions of the ears and an outwardly extending hook engaging with the standard at the apices of the sides.

In testimony whereof I affix my signature.

EDWARD HANNER.